US006285416B1

(12) United States Patent
Mitchell et al.

(10) Patent No.: US 6,285,416 B1
(45) Date of Patent: Sep. 4, 2001

(54) APPARATUS AND METHOD FOR A FOCUS POSITION LOCK DEVICE FOR A PROJECTION TELEVISION LENS ASSEMBLY

(75) Inventors: John David Mitchell, Alexandria, KY (US); Livyn Obiajuru Okorocha, Cincinnati, OH (US)

(73) Assignee: Corning Precision Lens, Cincinnati, OH (US)

( * ) Notice: Subject to any disclaimer, the term of this patent is extended or adjusted under 35 U.S.C. 154(b) by 0 days.

(21) Appl. No.: 09/306,471

(22) Filed: May 6, 1999

(51) Int. Cl.$^7$ ........................................... H04N 3/22
(52) U.S. Cl. .................. 348/745; 359/819; 359/822; 359/823
(58) Field of Search ............... 348/745; 359/819, 359/820, 822, 823, 824, 826

(56) References Cited

U.S. PATENT DOCUMENTS

| | | |
|---|---|---|
| 1,250,820 | 12/1917 | Dyer et al. . |
| 3,083,773 | 4/1963 | Nagel et al. ............... 166/176 |
| 4,371,594 | 2/1983 | Ohara et al. ............... 429/97 |
| 4,460,245 * | 7/1984 | Shimizu .................. 359/820 |
| 4,510,215 | 4/1985 | Adam ..................... 429/99 |
| 4,693,555 * | 9/1987 | Arai et al. ............... 359/820 |
| 4,776,681 | 10/1988 | Mosvich ................. 350/432 |
| 4,806,440 | 2/1989 | Hahs, Jr. et al. .......... 429/100 |
| 5,056,197 | 10/1991 | Cohen ..................... 24/304 |
| 5,202,706 * | 4/1993 | Hasegawa ............... 359/819 |
| 5,249,082 | 9/1993 | Newman ................. 359/813 |
| 5,276,555 * | 1/1994 | Sansbury ................ 359/826 |
| 5,576,895 * | 11/1996 | Ikeda .................... 359/820 |
| 5,577,836 | 11/1996 | Vent et al. ............... 362/61 |
| 5,577,855 | 11/1996 | Leyden et al. ............ 403/291 |
| 5,617,259 * | 4/1997 | Inoue ..................... 359/820 |
| 5,652,680 * | 7/1997 | Kashihara et al. ......... 359/819 |
| 5,653,550 | 8/1997 | Mutz et al. ............... 403/329 |
| 5,678,953 | 10/1997 | Usui et al. ............... 403/329 |

* cited by examiner

Primary Examiner—Reinhard J. Eisenzopf
Assistant Examiner—Trang U. Tran
(74) Attorney, Agent, or Firm—Alfred L Michaelsen (57) ABSTRACT

An apparatus and method for locking a focus position of a lens assembly without causing the lens cell to tilt, comprising: a spacer interposed between the lens cell and the focus mount. The spacer is received into a sleeve that is integral with the focus mount. The sleeve projects radially outward from the focus mount such that the spacer can be raised and lowered radially with respect to the focus mount. The spacer has a cylindrical body with a radial flange at one end. Moreover, the spacer has two ridges that extend downward from a lower surface of the flange, each of which is received into a corresponding groove on the sleeve, thus, preventing the spacer from rotating within the sleeve. The spacer also has an upwardly raised rim extending from an upper surface of the flange. The rim is slidably secured into a slot of the focus mount, which prevents lateral movement of the spacer. Further, a bolt is coupled to an opening within the spacer, such that one end of the bolt is disposed and secured within the spacer and the other end of the bolt extends radially outward through the slot of the focus mount. A nut is secured onto the bolt. After focusing the lens cell assembly, the nut is tightened onto the bolt in order to maintain focus of the lens cell assembly. The tightening of the nut brings an upper surface of the flange of the spacer into frictional engagement with an interior surface of the focus mount, which prevents the tilting of the lens cell within the focus mount, thus, maintaining a focus position of the lens assembly.

33 Claims, 5 Drawing Sheets

APPARATUS AND METHOD FOR A FOCUS POSITION LOCK DEVICE FOR A PROJECTION TELEVISION LENS ASSEMBLY

FIELD OF THE INVENTION

The present invention relates to projection television lens assemblies and in particular, to a focus position lock device employed in such assemblies.

BACKGROUND OF THE INVENTION

Projection televisions are well known. In general, a projection television set or projector includes three cathode ray tubes (CRTs), corresponding to the primary colors, red, blue, and green. Associated with each of the CRTs is a projection lens assembly, which is comprised of a plurality of optical lens units. Overall, a CRT has an attached faceplate, and the function of the lens assembly is to magnify the image appearing on the faceplate of the CRT, and thereby project it onto a viewing screen, which is much larger than the faceplate of the CRT. For a typical layout of the optical lens units in a projection television lens assembly see U.S. Pat. No. 4,776,681.

Basically a projection television lens assembly is made up of a plastic tubular member, generally referred to as a lens cell. It is the lens cell that has a plurality of optical lens units mounted within it. The lens cell itself is mounted within another plastic tubular member referred to as a focus mount. The mounting of the lens cell within the focus mount allows axial movement of one with respect to the other, which results in focusing the image onto the screen. An apparatus for achieving such adjustment is shown in U.S. Pat. No. 5,276,555. After the image is focused, the axial position of the lens cell is then locked with respect to the focus mount. In the past, the basic approach has been to screw in a bolt through a slot on the focus mount, and into a boss that is integral with the lens cell, which was then followed by a washer and a nut over the bolt. By turning the nut clockwise, that is, tightening the nut, the lens cell and the focus mount were pulled together to create a frictional lock. However, when the nut was tightened securely to maintain the focus of the projection television lens assembly, this led to the deformation of the plastic lens cell and the focus mount. The tightening of the nut also caused the lens cell containing the optical lens units within the focus mount to tilt, thus, causing an increase in flare on the image appearing on the screen.

An object of the invention is to provide a focus position lock device that maintains a focus position in a projection television lens system, and prevents any tilting of the lens cell containing the optical lens units. Another object of the invention is to provide a focus position lock device that prevents any distortion of the lens cell and the focus mount in a projection television lens assembly.

SUMMARY OF THE INVENTION

Accordingly, the present invention is directed to a projection television lens assembly that substantially obviates one or more of the limitations and disadvantages of the related art. The present invention provides a solution to the problems described above relating to lens cell assemblies in a projection television. Specifically the invention provides a means for mounting a lens cell in a focus mount so that when it is locked in place after focusing, the locking step does not result in tilting the lens cell.

In accordance with the broadest aspect of the present invention, a spacer, made of a non-rigid material, is interposed between the lens cell and the focus mount of a projection television lens assembly, where the spacer is adapted for radial movement. A fastener coupled to the spacer, is adapted for positioning the spacer and for locking a focus position of the projection television lens assembly. In a preferred embodiment, the spacer is received into a sleeve that projects radially outward from and is integral with the lens cell. The sleeve has a rim at an end distal to the lens cell, and the rim has two grooves on an upper surface, with each of the grooves being spaced approximately 180° apart and with each of the grooves being aligned to define a groove axis that passes through the grooves, the groove axis line being parallel to the central axis line passing through the center of the lens cell. Further, the spacer has a cylindrical body with a radial flange at one end. The cylindrical body of the spacer is disposed within the sleeve and where the bottom of the cylindrical body of the spacer does not physically contact the sleeve, thus, defining a gap between the bottom of the spacer and the sleeve. Moreover, the spacer has two ridges that extend downward from a lower surface of the radial flange, each of the ridges being received into the two respective grooves on the sleeve. The receipt of the ridges into the grooves prevents the spacer from rotating within the sleeve. The spacer further has an upwardly raised rim extending from an upper surface of the flange. The rim is slidably secured into a slot of the focus mount, which prevents lateral movement of the spacer. Further, a fastener is coupled to an opening in the spacer. The fastener is adapted for positioning the spacer and for locking the focus position. In one embodiment, the fastener comprises a bolt and a nut, where one end of the bolt is disposed and secured within the spacer and the other end of the bolt extends radially outward through the slot of the focus mount. The nut is secured onto the bolt. After establishing a focus position for the lens cell assembly, the nut is tightened onto the bolt in order to lock the focus position of the lens cell assembly. The tightening of the nut causes the spacer to rise radially within the sleeve and causes an upper surface of the radial flange of the spacer to frictionally engage an interior surface of the focus mount. Since the spacer is restricted from moving laterally and from rotating within the sleeve, during tightening of the nut onto the bolt, tilting of the lens cell is prevented and the focus position of the lens assembly is maintained. In another embodiment, a second sleeve identical in construction to the first sleeve is positioned approximately 180° apart from the first sleeve. Furthermore, a second spacer, made of a non-rigid material, is interposed between the lens cell and the focus mount, the second spacer being identical in construction to the first spacer. A second fastener is coupled to the second spacer, where the second fastener is adapted for positioning the second spacer and for locking the focus position of the projection television lens assembly.

In yet another embodiment of the invention, a method is provided for locking a focus position in a projection television lens assembly that comprises a lens cell and a focus mount, where the lens cell includes a plurality of lens units mounted therein, and where the lens cell is telescopically mounted within the focus mount. The method comprises the steps of interposing a spacer between the lens cell and the focus mount, the spacer being adapted for radial movement. The method further includes establishing a focus position for said projection television lens assembly and locking the focus position of the projection television lens assembly, while preventing the tilting of the lens cell within the focus mount. The interposing step further includes providing the lens cell with a sleeve that projects radially outward from and is integral with the lens cell, and where the sleeve has a spacer secured therein. The step of locking further comprises the step of coupling one end of a bolt to an opening within the spacer, where an opposite end of the bolt extends outward through a slot in the focus mount. The method further includes the step of securing a nut onto the bolt and tightening the nut such that an upper surface of a radial flange of the spacer becomes frictionally engaged with an interior surface of the focus mount. Alternatively, the method includes the step of providing the lens cell with a second sleeve that projects radially outward and is integral with the lens cell, where the respective sleeves are spaced approximately 180° apart from each other on the lens cell. Further, the method includes coupling one end of a second bolt to an opening within the second spacer, where an opposite end of the second bolt extends outward through a second slot in the focus mount. The method further includes the step of securing a second nut onto the second bolt and tightening the second bolt such that an upper surface of a radial flange of the second spacer becomes frictionally engaged with a second interior surface of the focus mount. In an alternative embodiment, the method steps of securing further comprises first securing a rubber washer, followed by a metal washer, around each of the respective bolts.

DESCRIPTION OF THE PREFERRED EMBODIMENT

The invention disclosed herein prevents tilting of a lens cell within a focus mount of a projection television lens assembly.

Figure 1:
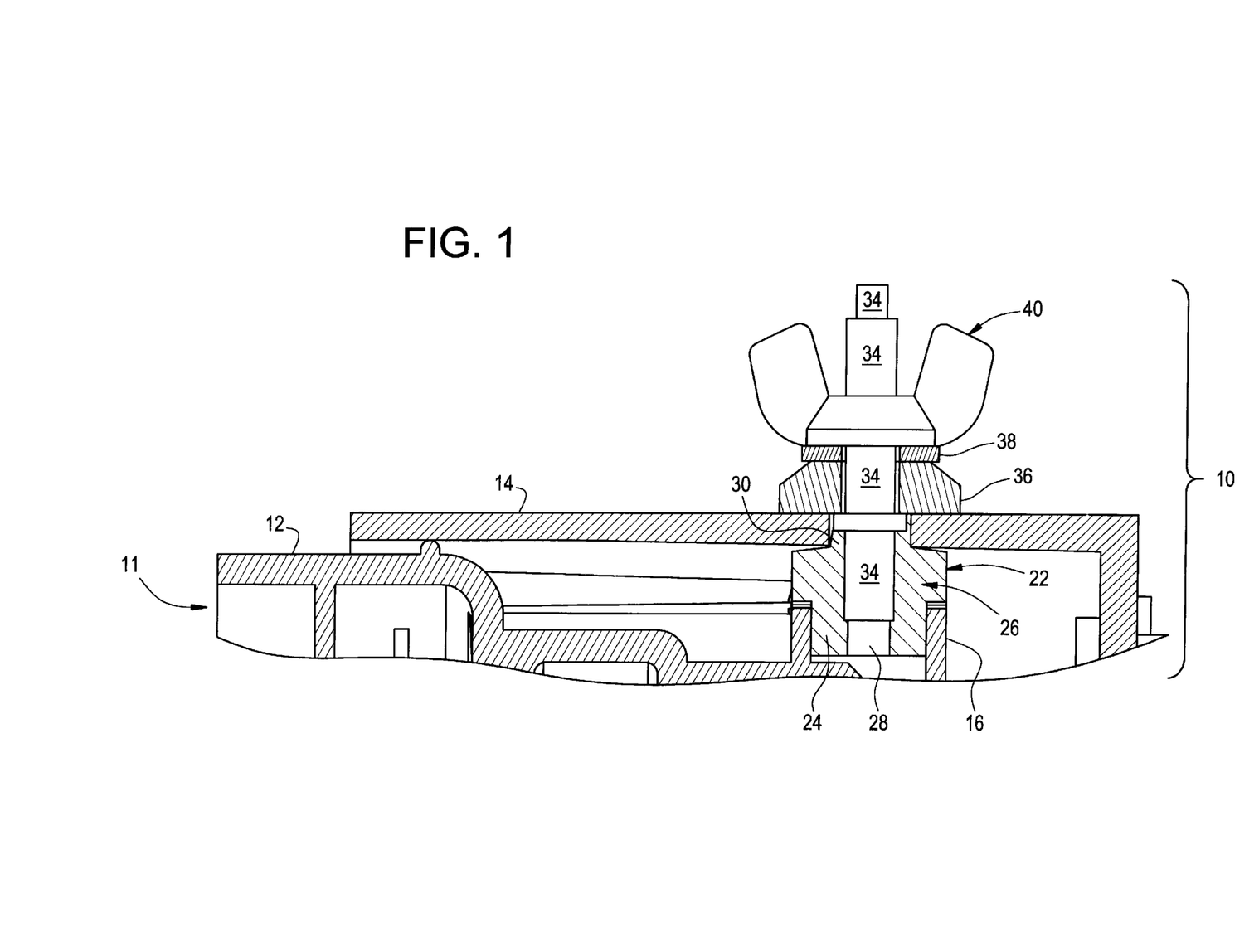
FIG. 1 is a fragmentary side-sectional view of a projection television lens assembly showing a focus position lock device in accordance with the invention.

The focus position lock device of the present invention is shown in FIG. 1 and is designated generally by reference numeral 10. The projection television lens assembly 11 comprises a lens cell 12 (shown in FIGS. 2 and 4) that is telescopically mounted within a focus mount 14 (shown in FIGS. 5–7). The lens cell 12 includes a plurality of optical lens units (shown in FIG. 8). The focus position of the lens cell 12 is manually adjusted with respect to the focus mount 14, and then the focus position lock device 10 is used to lock the focus position of the lens assembly 11.

Figure 2:
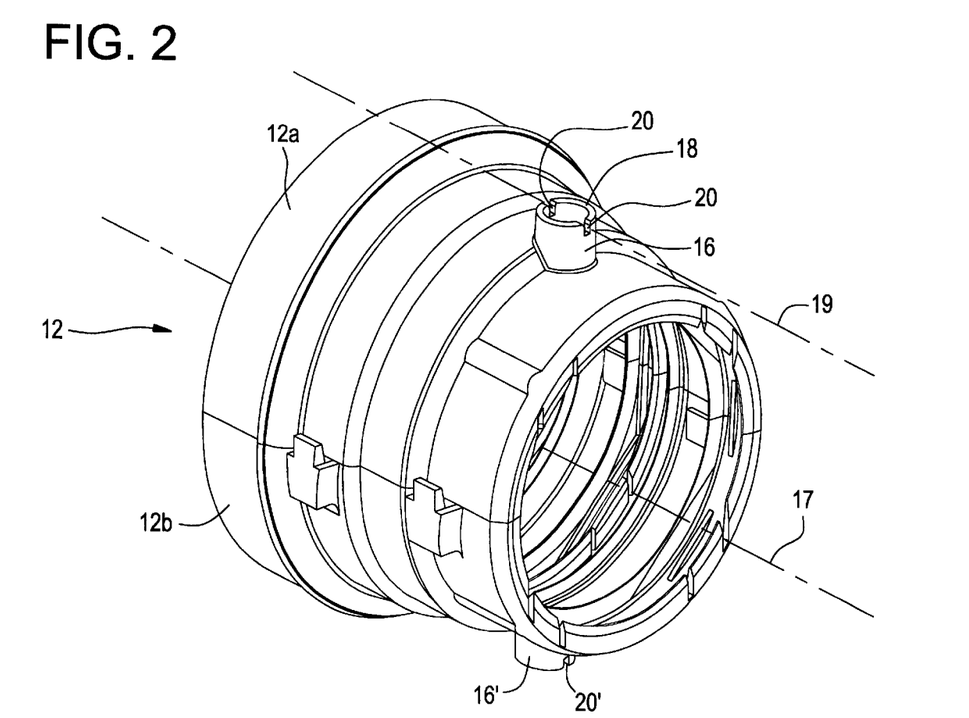
FIG. 2 is a perspective view of a lens cell used in a projection television lens assembly embodying a component part used in a preferred embodiment of the invention.

Referring to FIG. 2, the focus position lock device 10 comprises a sleeve 16 that projects radially outward and is integral with the lens cell 12. The sleeve 16 has a rim 18 that includes two grooves 20 on an upper surface. The two grooves 20 are spaced approximately 180° apart from each other on the rim 18 of the sleeve 16. Further, each of the two grooves 20 are aligned in a groove axis line 19 that is parallel to the central axis line 17 (shown in FIG. 2). The central axis line 17 being defined as the line that passes through the core of the lens cell 12. The longitudinal axis line passes through the core of the lens cell 12.

Figure 3:
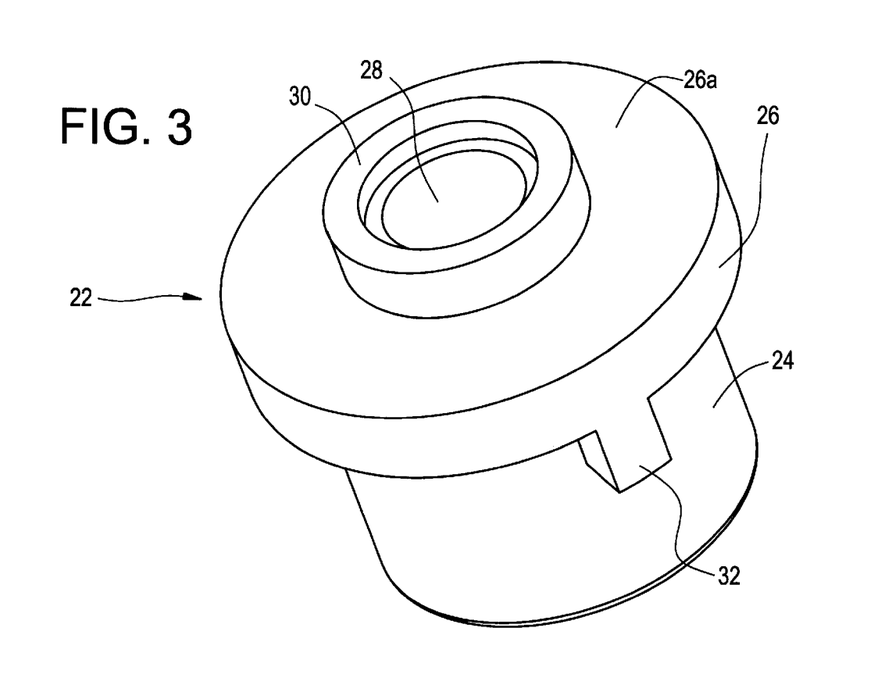
FIG. 3 is a perspective view of a spacer used in a lens cell in accordance with the present invention.
Figure 4:
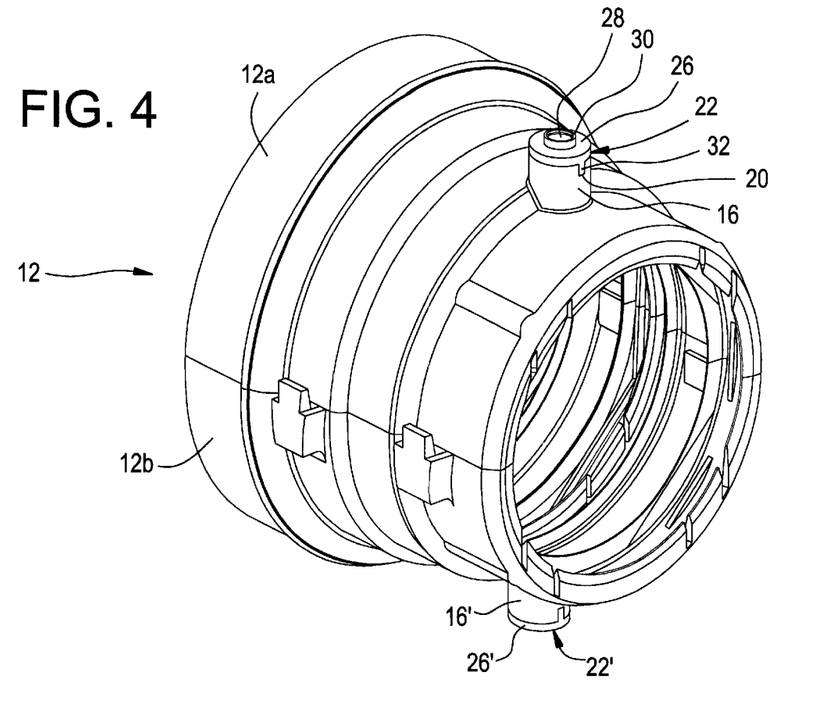
FIG. 4 is a perspective view of a lens cell assembly embodying the component part of FIG. 3 in accordance with the present invention.
Figure 5:
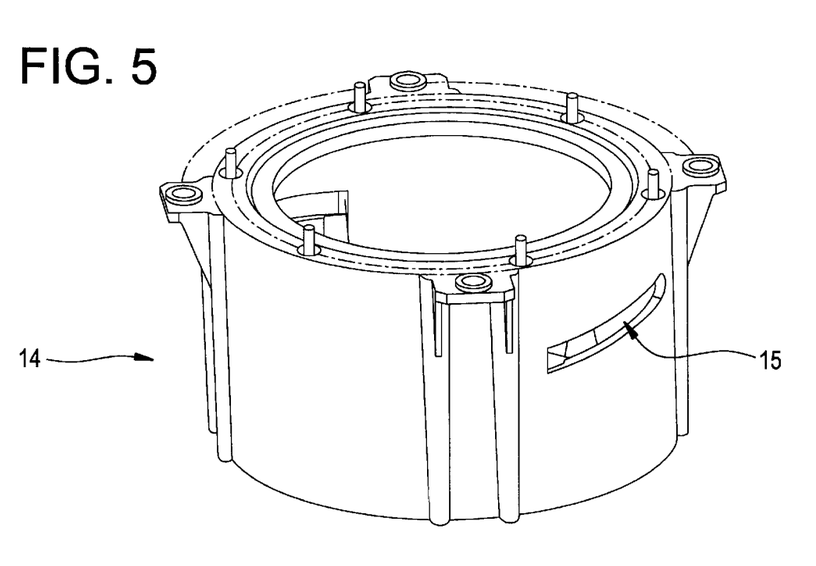
FIG. 5 is a perspective view of a focus mount used in a projection television lens assembly of the present invention.
Figure 6:
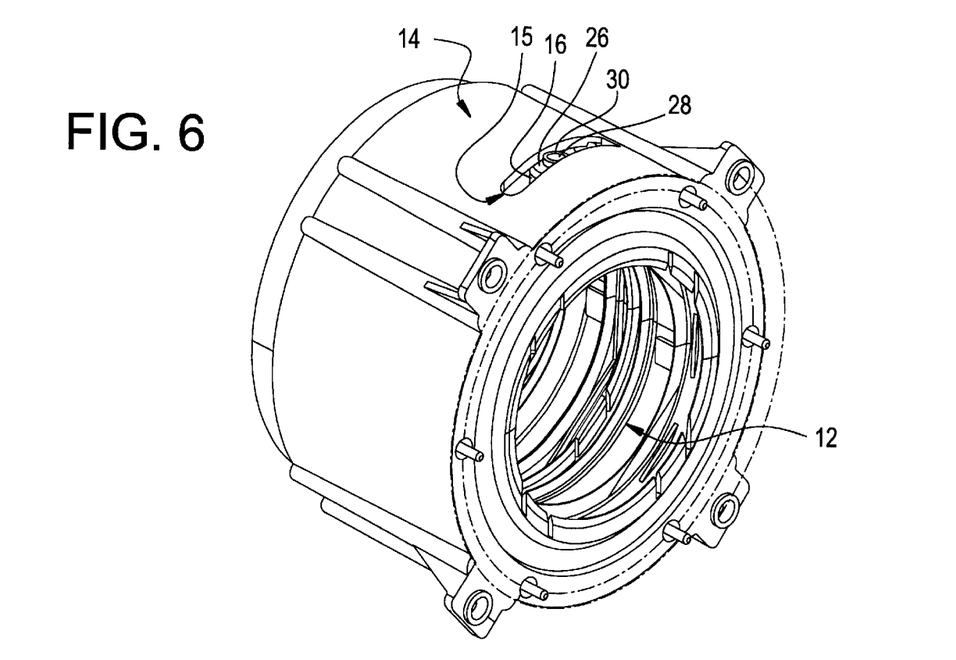
FIG. 6 is a perspective view of a semi-assembled projection television lens assembly in accordance with the present invention.
Figure 7:
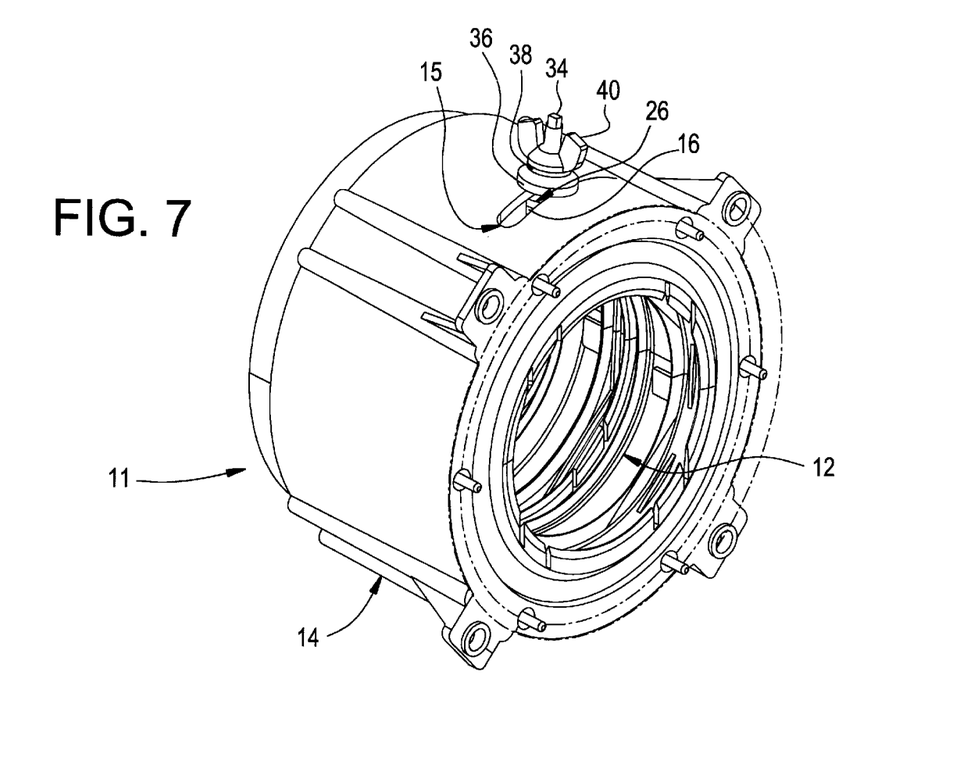
FIG. 7 is a perspective view of a fully-assembled projection television lens assembly in accordance with the present invention.
Figure 8:
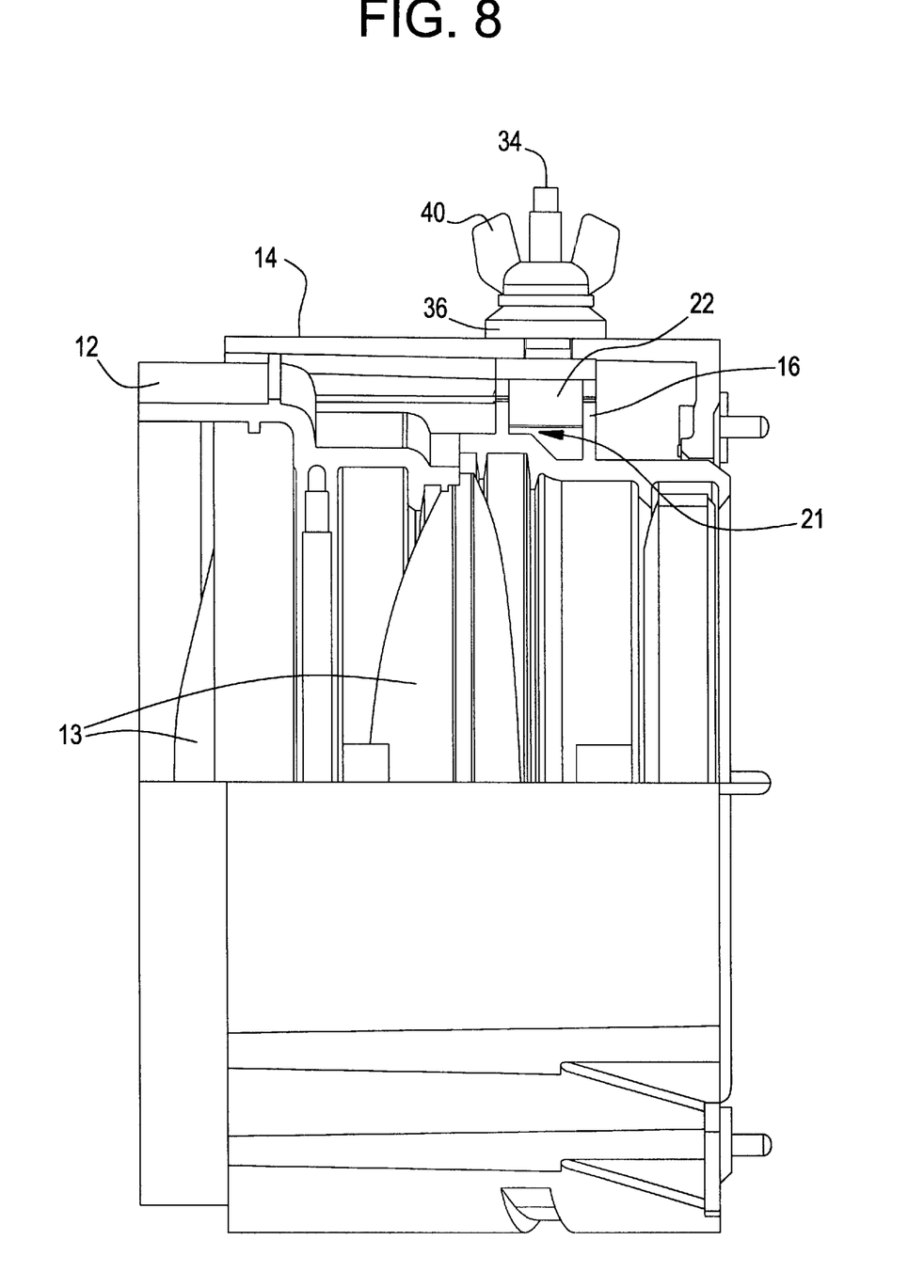
FIG. 8 is a fragmentary side-sectional view of the embodiment shown in FIG. 7.

The focus position lock device 10 further comprises a spacer 22, as shown in FIG. 3. The spacer 22 includes a cylindrical body 24, which has a radial flange 26 attached at one end. The flange 26 further has two ridges 32 (only one ridge 32 is shown in FIG. 3) that extend downward from a lower surface of the flange 26, each of the ridges 32 being spaced approximately 180° apart on the flange 26. The cylindrical body 24 of the spacer 22 is disposed within the sleeve 16, as shown in FIG. 4, with each of the ridges 32 of the spacer 22 being received within each of the grooves 20 of the sleeve 16. Further, the lower surface of the flange 26 of the spacer 22 abuts the upper surface of the rim 18 of the sleeve 16. The bottom surface of the spacer 22 does not contact the sleeve 16, instead only the cylindrical body 24 of the spacer 22 contacts the interior surface of the sleeve 16, and there is a gap 21, shown in FIG. 8, between the bottom of the cylindrical body 24 of the spacer 22 and the sleeve 16. As shown in FIGS. 3 and 4, the spacer 22 has an upwardly raised rim 30 extending from the upper surface 26a of the flange 26. There is an opening 28 that traverses the spacer 22 from the upper surface of the raised rim 30 through the cylindrical body 24. The sleeve 16 of the lens cell 12, which securely holds the spacer 22, is aligned below a slot 15 of the focus mount 14 (as shown in FIGS. 5 and 6), the slot 15 being obliquely disposed. In particular, the raised rim 30 of the spacer 22 is slidably secured within the slot 15 of the focus mount 14, as shown in FIGS. 1 and 6. Moreover, the slot 15 is rectangular in shape (as shown in FIG. 5) and the width is larger than the diameter of the raised rim 30 of the spacer 22, so that the raised rim 30 can be securely held within the slot 15. The spacer 22 and the lens cell 12 can be slidably moved across from one end of the slot 15 to the opposite end during focusing of the projection television lens assembly 11. The focus position lock device 10 further includes a threaded bolt 34, as shown in FIGS. 1 and 7. The bolt 34 is coupled to the opening 28 in the spacer 22 through the outside of the slot 15 of the focus mount 14, such that one end of the bolt 34 is positioned within and proximate to the cylindrical body 24 of the spacer 22 without the bolt 34 exiting the opening 28 at the bottom of the spacer 22. An opposite end of the bolt 34 extends outward through the slot 15 of the focus mount 14. In a preferred embodiment, the focus position lock device 10 includes a first washer 36 (shown clearly in FIGS. 1 and 7) around the bolt 34, such that the first washer 36 is proximate to an outer surface of the slot 15 of the focus mount 14. The first washer 36 is bigger than the width of the slot 15 of the focus mount 14. Furthermore, the focus position lock device 10 comprises a nut 40 (shown in FIGS. 1 and 7) that is secured onto the bolt 34. The nut 40 is positioned above the first washer 36 and the nut 40 is tightened to lock the focus position of the lens cell 12 within the focus mount 14. In a preferred embodiment, a second washer 38 is placed around the bolt 34, such that the second washer 38 is positioned above the first washer 36 and below the nut 40, as shown in FIGS. 1 and 7.

During assembly, the optical lens units 13 (shown in FIG. 8) are first securely mounted within the lens cell 12. The spacer 22 is disposed within the sleeve 16 such that the ridges 32 are received into the grooves 20, and the lower surface of the flange 26 of the spacer 22 abuts against the upper surface of the rim 18 of the sleeve 16, as shown FIG. 4. However, a gap 21 (shown in FIG. 8) is maintained between the spacer 22 and the sleeve 16. The lens cell 12 is then telescopically mounted within the focus mount 14, such that the raised rim 30 of the spacer 22 is positioned within the slot 15 of the focus mount 14 (as shown in FIG. 6). The bolt 34 is coupled to the opening 28 of the spacer 22 through the outside of the slot 15 of the focus mount 14, while ensuring that the bolt 34 does not exit through the opening 28 of the spacer 22 (as shown in FIG. 1). The first washer 36 is placed around the bolt 34, and then the second washer 38 is placed around the bolt 34 on top of the first washer 36. The nut 40 is secured onto the bolt 34, above the second washer 38. The tightening of the nut 40 onto the bolt 34 draws together the spacer 22 and the focus mount 14. In particular, the two ridges 32 of the spacer 22 are received into the two grooves 20 of the sleeve 16, which prevent the spacer 22 from rotating within the sleeve 16 while the nut 40 is being tightened. Further, the design of the focus lock device 10 is such that the ridges 32 of the spacer 22 do not exit the grooves 20 of the sleeve 16, but remain secured during the tightening of the nut 40. Moreover, the raised rim 30 of the spacer 22 is slidably secured within the slot 15 of the focus mount 14, which further restrains the lateral movement of the spacer 22 during the tightening of the nut 40. Although the cylindrical body 24 of the spacer 22 is secured within the sleeve 16, the spacer 22 is permitted to radially rock within the sleeve 16. More specifically, the tightening of the nut 40 only causes the spacer 22 to radially rise about 0.010" such that the upper surface 26a of the flange 26 of the spacer 22 becomes frictionally engaged with the interior surface of the focus mount 14 (shown in FIGS. 1 and 7). As a result, any tilting of the lens cell 12 within the focus mount 14 is prevented. Similarly, during the unlocking of the focus position lock device 10, the nut 40 is loosened, that is, turned counter-clockwise so that the upper surface 26a of the flange 26 of the spacer 22 becomes frictionally disengaged from the interior surface of the focus mount 14, thus, enabling the spacer 22 and the lens cell 12 to be slidably moved across the obliquely disposed slot 15 of the focus mount 14, thus allowing rotation of the lens cell 12 with respect to the central axis line 17, so that the lens assembly 11 can be focused. Also, when the focus position lock device 10 is unlocked, the ridges 32 of the spacer 22 are still received within the grooves 20 of the sleeve 16.

In a preferred embodiment, the lens cell 12 has a second focus position lock device 10' that is identical in construction to the focus position lock device 10 described above. In the drawings, the prime symbol is used next to numerals to indicate the same or similar elements that are associated with the second focus position lock device 10'. The two focus position lock devices 10 and 10 are positioned approximately 180° apart from each other on the lens cell 12, as shown in FIGS. 2 and 4.

In another aspect of the invention, a method is provided for locking a focus position in a projection television lens assembly 11 that comprises a lens cell 12 and a focus mount 14, where the lens cell 12 includes a plurality of optical lens units mounted within, and where the lens cell 12 is telescopically mounted within the focus mount 14. The method comprises the steps of interposing a spacer 22 between the lens cell 12 and the focus mount 14, the spacer 22 being adapted for radial movement. The method further includes establishing a focus position for the projection television lens assembly 11 and locking the focus position of the projection television lens assembly 11, while preventing the tilting of the lens cell 12 within the focus mount 14. The method step of interposing further comprises the step of providing the lens cell 12 with a sleeve 16 that projects radially outward and is integral with the lens cell 12, and has a spacer 22 secured therein. The method further comprises establishing a focus position for the projection television lens assembly 11, and locking the focus position such that the tilting of the lens cell 12 within the focus mount 14 is prevented. The step of locking further comprises the steps of coupling one end of a bolt 34 to an opening within the spacer 22, where an opposite end of the bolt 34 extends outward through a slot 15 in the focus mount 14. The method further includes the step of securing a nut 40 onto the bolt 34 and tightening the nut 40 such that an upper surface 26a of a radial flange 26 of the spacer 22 becomes frictionally engaged with an interior surface of the focus mount 14. Alternatively, the method includes the step of providing the lens cell with a second sleeve 16' that projects radially outward and is integral with the lens cell 12, where the second sleeve 16' has a second spacer 22' secured therein, and where the first sleeve 16 is approximately 180° apart from the second sleeve 16' on the lens cell 12. Further, the method includes coupling one end of a second bolt 34' to an opening 28' within the second spacer 22', where an opposite end of the second bolt 34' extends outward through a second slot 15' in the focus mount 14. The method further includes the step of securing a second nut 40' onto the second bolt 34' and tightening the second nut 40' such that an upper surface 26a' of a radial flange 26' of the second spacer 22' becomes frictionally engaged with a second interior surface of the focus mount 14. In yet another preferred embodiment, the method steps of securing further comprises first securing rubber washers 36 and 36' around the first bolt 34 and the second bolt 34', respectively, and then securing metal washers 38 and 38' on top of the rubber washers 36 and 36' before securing the nuts 40 and 40'.

In a preferred embodiment, the lens cell 12, the focus mount 14, including the sleeve 16 and the spacer 22, are all made of a plastic material, preferably polycarbonate that is 10% glass filled. The first washer 36 is made of a rubber material, whereas, the second washer 38 is made of metal. Further, the bolt 34 and the nut 40 are each made of metal. In the preferred embodiment, the bolt 34 is threaded and both a first washer 36 and a second washer 38 are placed around the bolt 34 before securing the nut 40. However, modifications and variations will be apparent to one skilled in the art without departing from the spirit or the scope of the invention.

It is to be understood that both the foregoing general description and the following detailed description are exemplary and explanatory and are intended to provide further explanation of the invention as claimed.

What is claimed is:

1. A projection television lens assembly, comprising:
    a focus mount;
    a lens cell having a longitudinal axis and a plurality of optical lens units mounted therein, said lens cell being telescopically mounted within said focus mount;
    a spacer interposed between said lens cell and said focus mount, said spacer lying along a transverse axis relative to said longitudinal axis and being coupled to said lens cell such that, (i) when said spacer undergoes a rotational force about said transverse axis, a longitudinal force is not exerted on said lens cell and (ii) said spacer may be moved radially along said transverse axis without exerting a radial force on said lens cell; and a fastener coupled to said spacer, said fastener operative to move said spacer radially for locking a focus position of said projection television lens assembly.

2. The projection television lens assembly of claim 1, wherein said spacer is received into a sleeve, said sleeve projecting radially from and being integral with said lens cell, said sleeve having a rim at an end distal to said lens cell, said rim having two grooves on an upper surface, each of said grooves being spaced approximately 180' apart.

3. The projection television lens assembly of claim 2, wherein said spacer further comprises a cylindrical body with a radial flange at one end, said cylindrical body of said spacer being disposed within said sleeve the bottom of said cylindrical body being spaced apart from said sleeve, said spacer further comprising two ridges extending downward from a lower surface of said flange, each of said ridges being spaced approximately 180° apart on said flange, each of said ridges being received within each of said grooves of said sleeve.

4. The projection television lens assembly of claim 3, wherein said spacer further comprises an upwardly raised rim extending from an upper surface of said flange, said raised rim of said spacer being securely held within a slot of said focus mount, and wherein said spacer has an opening traversing said spacer from said raised rim through said cylindrical body.

5. The projection television lens assembly of claim 4, wherein said fastener further comprises a bolt and a nut, one end of said bolt being coupled into said opening within said cylindrical body of said spacer, and an opposite end of said bolt extending radially outward through said focus mount, said nut being secured onto said bolt.

6. The projection television lens assembly of claim 5, wherein the tightening of said nut onto said bolt causes said upper surface of said flange to radially move outward toward said focus mount and to become frictionally engaged with an interior surface of said focus mount.

7. A focus position lock device for use in a projection television lens system, said projection television lens system comprising: a lens cell having a plurality of optical lens units mounted therein; and a focus mount having a slot therein, said lens cell being telescopically mounted within said focus mount, said focus position lock device further comprising:

a sleeve projecting radially outward from and integral with said lens cell, said sleeve having a rim at an end distal to said lens cell, said rim further including two grooves on an upper surface, each of said grooves being spaced approximately 180° apart on said rim of said sleeve, said sleeve being aligned below said slot of said focus mount;

a spacer comprising a cylindrical body with a radial flange at one end, said cylindrical body of said spacer being disposed within said sleeve with the bottom of said cylindrical body being spaced apart from said sleeve, said spacer having an opening traversing said spacer from an upper surface of said flange through said cylindrical body, said opening being surrounded by an upwardly raised rim extending from said upper surface of said flange, said raised rim of said spacer being securely held within said slot of said focus mount, said flange further comprising two ridges extending downward from a lower surface of said flange, each of said ridges being spaced approximately 180° apart on said flange, each of said ridges being received within each of said grooves of said sleeve;

a bolt coupled to said opening of said raised rim of said spacer, one end of said bolt being disposed and secured within said cylindrical body of said spacer and an opposite end of said bolt extending outward through said slot of said focus mount; and a nut secured onto said bolt.

8. The focus position lock device of claim 7, further comprising a first washer placed around said bolt, said first washer being proximate to an outer surface of said slot of said focus mount, said first washer being bigger in size than said slot of said focus mount; and a second washer placed around said bolt, said second washer being positioned above said first washer and below said nut.

9. The focus position lock device of claim 7, wherein said lower surface of said flange of said spacer abuts said upper surface of said rim of said sleeve, and wherein said spacer is adapted for radial movement with respect to said focus mount.

10. The focus position lock device of claim 7, wherein the tightening of said nut onto said bolt draws together said spacer and said focus mount, whereby said upper surface of said flange of said spacer is brought into frictional engagement with an interior surface of said focus mount.

11. The focus position lock device of claim 7, wherein said lens cell, said focus mount, said sleeve and said spacer are each made of a plastic material.

12. The focus position lock device of claim 7, wherein said first washer is made of rubber.

13. The focus position lock device of claim 7, wherein said second washer, said bolt and said nut are each made of metal.

14. A projection television lens system comprising:

three cathode ray tubes;

a screen;

a lens assembly coupled to each of said cathode ray tubes for projecting light from each of said cathode ray tubes onto said screen to form an image, said lens assembly further comprising:

a focus mount having a first slot;

a lens cell having a plurality of optical lens units mounted therein, said lens cell being telescopically mounted within said focus mount; and a first focus position lock device for locking the focus position of said optical lens units, said first focus position lock device further comprising:

a first sleeve projecting radially outward from and being integral with said lens cell, said first sleeve having a rim at an end distal to said lens cell, said rim having two grooves on an upper surface, each of said grooves being spaced approximately 180° apart on said rim of said first sleeve, each of said grooves being aligned to define a groove axis line that is parallel to the central axis line passing through the core of said lens cell, said first sleeve being aligned below said first slot of said focus mount;

a first spacer comprising a cylindrical body with a radial flange at one end, said cylindrical body of said first spacer being disposed within said first sleeve, the bottom of said cylindrical body being spaced apart from said sleeve, said first spacer having an upwardly raised rim extending from an upper surface of said flange, said first spacer having an opening traversing said first spacer from said raised rim through said cylindrical body, said raised rim of said first spacer being adapted to securely fit into said first slot of said focus mount, said flange further comprising two ridges extending downward from a lower surface of said flange, each of said ridges being spaced approximately 180° apart on said flange, each of said ridges being received within each of said grooves of said first sleeve;

a first bolt coupled to said opening of said raised rim of said first spacer, one end of said first bolt being disposed and secured within said cylindrical body of said first spacer and an opposite end of said first bolt extending outward through said first slot of said focus mount; and a first nut secured onto said first bolt, said first nut being adapted to lock the focus position of said lens cell of said projection television lens system.

15. The projection television lens system of claim 14, wherein said lens assembly further comprises: a first washer placed around said first bolt, said first washer being positioned on top of said first slot of said focus mount, said first washer being bigger in size than said first slot of said focus mount; and a second washer placed around said first bolt, said second washer being positioned above said first washer and below said first nut.

16. The projection television lens system of claim 15, wherein said lens cell, said focus mount, said sleeve and said spacer are each made of a plastic material.

17. The projection television lens system of claim 15, wherein said focus mount further comprises a second slot, said second slot being positioned approximately 180° apart from said first slot on said focus mount.

18. The projection television lens assembly of claim 15, wherein each of said grooves are aligned to define a groove axis line that is parallel to the central axis line passing through the core of said lens cell.

19. The projection television lens system of claim 18, further comprising:

a second focus position lock device for locking the focus position of said lens assembly, said second focus position lock device, further comprising:

a second sleeve projecting radially outward from and integral with said lens cell, said second sleeve being positioned approximately 180° apart from said first sleeve on said lens cell, said second sleeve having a rim at an end distal to said lens cell, said rim of said second sleeve having two grooves on an upper surface, each of said grooves being spaced approximately 180° apart on said rim of said second sleeve, each of said grooves being aligned to define a second groove axis line that is parallel to the central axis line passing through the core of said lens cell, said second sleeve being aligned below said second slot of said focus mount;

a second spacer comprising a cylindrical body with a radial flange at one end, said cylindrical body of said second spacer being disposed within said second sleeve, said second spacer having an upwardly raised rim extending from an upper surface of said flange, said second spacer having an opening traversing said second spacer from said raised rim through said cylindrical body, said raised rim of said second spacer being securely held within said second slot of said focus mount, a lower surface of said flange further comprising two ridges extending downward, each of said ridges being spaced approximately 180° apart on said flange, each of said ridges of said second spacer being received within each of said grooves of said second sleeve;

a second bolt coupled to said opening of said raised rim of said second spacer, one end of said second bolt being disposed and secured within said cylindrical body of said second spacer and an opposite end of said second bolt extending outward through said second slot of said focus mount; and a second nut secured onto said second bolt, said second nut being adapted to lock the focus position of said lens cell of said projection television lens system.

20. The projection television lens system of claim 19, wherein said lens assembly further comprises: a third washer placed around said second bolt, said third washer being positioned on top of said second slot of said focus mount, said third washer being bigger in size than said second slot of said focus mount; and a fourth washer placed around said second bolt, said fourth washer being positioned above said third washer and below said second nut.

21. The projection television lens assembly of claim 20, wherein the tightening of said first nut onto said first bolt and the tightening of said second nut onto said second bolt draws together said focus mount and each of said first spacer and said second spacer.

22. The projection television lens system of claim 21, wherein upon tightening each of said first nut and said second nut of said lens assembly, said upper surface of said flange of each of said first spacer and said second spacer becomes frictionally engaged with a corresponding interior surface of said focus mount.

23. The projection television lens assembly of claim 21, wherein each of said first washer and said third washer is made of a rubber material, and wherein each of said second washer and said fourth washer is made of metal.

24. A method of locking a focus position in a projection television lens assembly, comprising a lens cell having a plurality of optical lens units mounted therein and a focus mount, said lens cell being telescopically mounted within said focus mount, said method comprising the steps of:

providing said lens cell with a first sleeve that projects radially outward from and is integral with said lens cell, said first sleeve having a first spacer secured therein;

establishing a focus position for said projection television lens assembly; and locking said focus position of said projection television lens assembly such that tilting of said lens cell within said focus mount is prevented while locking.

25. The method of claim 24, wherein said step of locking further comprises the steps of:

coupling one end of a first bolt to an opening within a cylindrical body of said first spacer, wherein an opposite end of said first bolt extends outward through a first slot of said focus mount; and securing a first nut onto said opposite end of said first bolt.

26. The method of claim 24, wherein said providing step further comprises:

providing said lens cell with a second sleeve that projects radially outward from and is integral with said lens cell, said second sleeve having a second spacer secured therein, said second sleeve being approximately 180° apart from said first sleeve on said lens cell.

27. The method of claim 26, wherein said locking step further comprises:

coupling one end of a second bolt to an opening within a cylindrical body of said second spacer, wherein an opposite end of said second bolt extends outward through a second slot of said focus mount, said second slot being approximately 180° apart from said first slot on said focus mount; and securing a second nut onto said opposite end of said second bolt.

28. The method of claim 25, wherein said step of securing a first nut further comprises the step of first placing a first washer around said first bolt.

29. The method of claim 27, wherein said step of securing a second nut further comprises the step of first placing a second washer around said second bolt.

30. The method of claim 28, wherein said step of securing said first nut further comprises the step of tightening said first nut onto said first bolt such that an upper surface of a radial flange of said first spacer becomes frictionally engaged with a first interior surface of said focus mount.

31. The method of claim 29, wherein said step of securing said second nut further comprises the step of tightening said second nut onto said second bolt such that an upper surface of a radial flange of said second spacer becomes frictionally engaged with a second interior surface of said focus mount.

32. A method of preventing tilting of a lens cell telescopically mounted within a focus mount when locking a focus position of a projection television lens assembly, said method comprising the steps of:

interposing a spacer between said lens cell and said focus mount, said spacer lying along a transverse axis relative to a central longitudinal axis of said lens cell;

coupling said spacer to said lens cell in a manner which prevents rotation of said spacer about said transverse axis and allows radial movement of said spacer along said transverse axis;

establishing a focus position for said projection television lens assembly;

coupling a fastener to said spacer; and using said fastener to move said spacer radially along said transverse axis and into frictional engagement with an interior surface of said focus mount thereby locking said focus position of said projection television lens assembly.

33. The method of claim 32, wherein the coupling step further comprises:

coupling said spacer to an integral projecting portion of said lens cell aligned along said transverse axis.

\* \* \* \* \*